(12) United States Patent
Park et al.

(10) Patent No.: US 12,373,704 B2
(45) Date of Patent: Jul. 29, 2025

(54) CONTROL SIMULATION METHOD BASED ON ARTIFICIAL INTELLIGENCE

(71) Applicants: MakinaRocks Co., Ltd., Seoul (KR); Hanon Systems, Daejeon (KR)

(72) Inventors: Hongje Park, Gyeonggi-do (KR); Sanghyeok Choi, Seoul (KR); Jongwon Park, Seoul (KR); Minseop Kim, Seoul (KR); Jeonghoon Lee, Sejong-si (KR); Joongjae Kim, Daejeon (KR); Ikchan Ju, Daejeon (KR)

(73) Assignees: MAKINAROCKS CO., LTD., Seoul (KR); HANON SYSTEMS, Daejeon (KR)

( * ) Notice: Subject to any disclaimer, the term of this patent is extended or adjusted under 35 U.S.C. 154(b) by 0 days.

(21) Appl. No.: 18/506,608

(22) Filed: Nov. 10, 2023

(65) Prior Publication Data
US 2024/0160951 A1    May 16, 2024

(30) Foreign Application Priority Data
Nov. 14, 2022    (KR) .......................... 10-2022-0151352

(51) Int. Cl.
*G06N 3/10*    (2006.01)
(52) U.S. Cl.
CPC ...................................... *G06N 3/10* (2013.01)
(58) Field of Classification Search
CPC ....................................................... G06N 3/10
See application file for complete search history.

(56) References Cited

U.S. PATENT DOCUMENTS

2018/0341860 A1*  11/2018  Shazeer .................. G06N 20/00
2020/0371481 A1   11/2020  Chen et al.
(Continued)

FOREIGN PATENT DOCUMENTS

EP              4015311 A1    6/2022
KR       1020190096311 A      8/2019
(Continued)

OTHER PUBLICATIONS

Xianghua Fu et al., "Lexicon-Enhanced LSTM With Attention for General Sentiment Analysis", IEEE Access, Oct. 29, 2018.
(Continued)

*Primary Examiner* — Douglas King
(74) *Attorney, Agent, or Firm* — Umberg Zipser LLP

(57) ABSTRACT

Disclosed is a method for control simulation based on artificial intelligence according to an exemplary embodiment of the present disclosure. Specifically, according to the present disclosure, a computing device obtains a first state information, a second state information, and a control information, and generates first output information based on the first state information, the second state information, and the control information by using an artificial neural network model including a sequential neural network. In this case, the first output information includes one or more output variables, and at least some of the one or more output variables correspond to variables included in the second state information, and the first output information is generated based on applying an attention mechanism to each of the one or more output variables.

10 Claims, 7 Drawing Sheets

(56) References Cited

U.S. PATENT DOCUMENTS

| | | | |
|---|---|---|---|
| 2021/0190362 A1 | 6/2021 | Ko et al. | |
| 2022/0092413 A1* | 3/2022 | Wang | G06N 5/022 |
| 2022/0270480 A1 | 8/2022 | Lee et al. | |

FOREIGN PATENT DOCUMENTS

| | | | |
|---|---|---|---|
| KR | 1020200129198 A | 11/2020 | |
| KR | 102247165 B1 | 4/2021 | |
| KR | 1020210122181 A | 10/2021 | |
| KR | 1020220070327 A | 5/2022 | |
| KR | 102408011 B1 | 6/2022 | |
| KR | 1020220128033 A | 9/2022 | |

OTHER PUBLICATIONS

Yequan Wang et al., "Attention-based LSTM for Aspect-level Sentiment Classification", Proceedings of the 2016 Conference on Empirical Methods in Natural Language Processing, pp. 606-615, Austin, Texas, Nov. 1-5, 2016.

* cited by examiner

CONTROL SIMULATION METHOD BASED ON ARTIFICIAL INTELLIGENCE

CROSS-REFERENCE TO RELATED APPLICATIONS

This application claims priority to and the benefit of Korean Patent Application No. 10-2022-0151352 filed in the Korean Intellectual Property Office on Jan. 14, 2023, the entire contents of which are incorporated herein by reference.

TECHNICAL FIELD

The present disclosure relates to a control simulation method based on artificial intelligence, and particularly, to a method for simulating a control environment by generating first output information including some of state information based on the state information and control information by using an artificial neural network model including a sequential neural network.

BACKGROUND ART

With the development of artificial intelligence technology such as deep learning, artificial intelligence models are widely used in each field of the industry.

Among them, in a control field, a control system based on the deep learning may show better performance than control using a PID algorithm in the related art, and the related research is actively underway.

However, testing in an actual environment to measure the performance of the AI control model causes a significant cost, and the more complicated the system to be controlled, the more the cost increases.

Therefore, research on how to construct a virtual simulation environment without testing in the actual environment is underway. However, since variables observed in an external environment of the control system and inside the control system have different delayed time, there is a practical difficulty in constructing a model that simulates an operation close to the actual control environment.

Therefore, there is a demand of the industry on how to simulate the actual control environment by constructing an AI model with reasonable performance.

Korean Patent Unexamined Publication No. 2022-0070327 discloses Vehicle Control Method, Apparatus, and Vehicle.

SUMMARY OF THE INVENTION

The present disclosure is contrived in response to the background art, and has been made in an effort to simulate an actual control environment by using an artificial neural network model by obtaining a first state information, a second state information, and a control information, and inputting the information into an artificial neural network model including a sequential neural network to generate output information including variables included in one or more second state information.

An exemplary embodiment of the present disclosure provides a method for control simulation based on artificial intelligence. The method may include: obtaining a first state information, a second state information, and a control information; and generating first output information based on the first state information, the second state information, and the control information by using an artificial neural network model including a sequential neural network, and the first output information may include a one or more output variables, at least some of the one or more output variables may correspond to variables included in the second state information, and the first output information may be generated based on applying an attention mechanism to each of the one or more output variables.

In an exemplary embodiment, the first state information may include variables related to the outside of a control environment, and the second state information may include variables related to the inside of the control environment.

In an exemplary embodiment, the generating of the first output information including the prediction value for the second state information based on the first state information, the second state information, and the control information by using the artificial neural network model including the sequential neural network may include generating hidden state information at a control time point based on inputting the first state information, the second state information, and the control information into the sequential neural network, calculating attention values at the control time point with respect to the one or more output variables, respectively based on the hidden state information, and generating the first output information based on the attention values.

In an exemplary embodiment, the calculating of the attention values at the control time point with respect to the one or more output variables, respectively based on the hidden state information may include generating query vectors and value vectors of a number corresponding to the one or more output variables based on the hidden state information, calculating an attention score for each of the one or more output variables based on the query vector, calculating an attention distribution based on the attention score, and calculating attention values with respect to the one or more output variables, respectively based on the attention distribution and the value vector.

In an exemplary embodiment, the generating of the query vectors and the value vectors of a number corresponding to the one or more output variables based on the hidden state information may include generating the query vectors and the value vectors of a number corresponding to the one or more output variables based on inputting the hidden state information into a fully connected layer.

In an exemplary embodiment, the generating of the query vectors and the value vectors of a number corresponding to the one or more output variables based on the hidden state information may include concatenating the control information to the hidden state information, and generating the query vectors and the value vectors of a number corresponding to the one or more output variables based on the concatenated information.

In an exemplary embodiment, the method may further include: generating second output information based on the hidden state information; and generating final output information based on the first output information and the second output information.

In an exemplary embodiment, the final output information may be generated based on a result of a weighted sum operation of a value of the output variable included in the first output information and a value of the corresponding output variable included in the second output information.

In an exemplary embodiment, a weight of the weighted sum operation may be set differently for each output variable.

Another exemplary embodiment of the present disclosure provides a computer program which allows at least one processor to perform operations for control simulation based on artificial intelligence. The operations may include: an operation of obtaining a first state information, a second state information, and a control information; and an operation of generating first output information based on the first state information, the second state information, and the control information by using an artificial neural network model including a sequential neural network, and the first output information may include a one or more output variables, at least some of the one or more output variables may correspond to variables included in the second state information, and the first output information may be generated based on applying an attention mechanism to each of the one or more output variables.

Still another exemplary embodiment of the present disclosure provides a computing device which performs operations for control simulation based on artificial intelligence. The computing device may include: at least one processor; and a memory, and the at least one processor obtain a first state information, a second state information, and a control information, and generate first output information based on the first state information, the second state information, and the control information by using an artificial neural network model including a sequential neural network, and the first output information may include a one or more output variables, at least some of the one or more output variables may correspond to variables included in the second state information, and the first output information may be generated based on applying an attention mechanism to each of the one or more output variables.

According to an exemplary embodiment of the present disclosure, a control simulation method based on artificial intelligence can be provided. For example, according to an exemplary embodiment of the present disclosure, a model for simulating an actual control environment by obtaining a first state information, a second state information, and a control information, and generating first output information based on the first state information, the second state information, and the control information by using an artificial neural network model including a sequential neural network can be provided.

DETAILED DESCRIPTION

Figure 1:
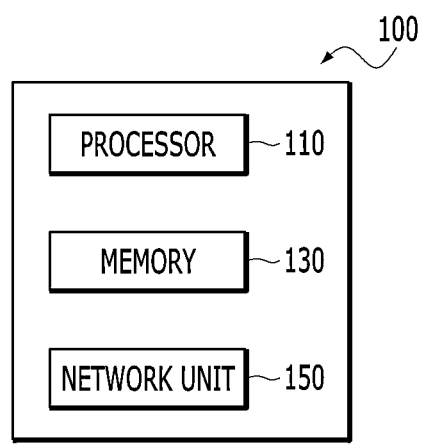
FIG. 1 is a block diagram of a computing device for performing control simulation based on artificial intelligence according to an exemplary embodiment of the present disclosure.

The present disclosure discloses a method for generating new state information based on state information and control information by using an artificial neural network model including a sequential neural network in order to perform artificial intelligence based control simulation.

The present disclosure discloses a method of detecting a change by receiving an original image and a comparison target image, that is, a pair of images, by using a change detection model trained with the pair of images including a transformed image generated by transforming the original image as training data.

Various exemplary embodiments are described with reference to the drawings. In the present specification, various descriptions are presented for understanding the present disclosure. However, it is obvious that the exemplary embodiments may be carried out even without a particular description.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and a computing device may be components. One or more components may reside within a processor and/or an execution thread. One component may be localized within one computer. One component may be distributed between two or more computers. Further, the components may be executed by various computer readable media having various data structures stored therein. For example, components may communicate through local and/or remote processing according to a signal (for example, data transmitted to another system through a network, such as the Internet, through data and/or a signal from one component interacting with another component in a local system and a distributed system) having one or more data packets.

Further, a term "or" intends to mean comprehensive "or" not exclusive "or". That is, unless otherwise specified or when it is unclear in context, "X uses A or B" intends to mean one of the natural comprehensive substitutions. That is, in the case where X uses A; X uses B; or, X uses both A and B, "X uses A or B" may apply to either of these cases. Further, a term "and/or" used in the present specification shall be understood to designate and include all of the possible combinations of one or more items among the listed relevant items.

Further, a term "include" and/or "including" shall be understood as meaning that a corresponding characteristic and/or a constituent element exists. Further, it shall be understood that a term "include" and/or "including" means that the existence or an addition of one or more other characteristics, constituent elements, and/or a group thereof is not excluded. Further, unless otherwise specified or when it is unclear that a single form is indicated in context, the singular shall be construed to generally mean "one or more" in the present specification and the claims.

Further, the term "at least one of A and B" should be interpreted to mean "the case including only A", "the case including only B", and "the case where A and B are combined".

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented as hardware or software depends on a specific application or design restraints given to the general system. Those skilled in the art may implement the functionality described by various methods for each of the specific applications. However, it shall not be construed that the determinations of the implementation deviate from the range of the contents of the present disclosure.

The description about the presented exemplary embodiments is provided so as for those skilled in the art to use or carry out the present disclosure. Various modifications of the exemplary embodiments will be apparent to those skilled in the art. General principles defined herein may be applied to other exemplary embodiments without departing from the scope of the present disclosure. Therefore, the present disclosure is not limited to the exemplary embodiments presented herein. The present disclosure shall be interpreted within the broadest meaning range consistent to the principles and new characteristics presented herein.

In the present disclosure, a sequential neural network model as an artificial neural network model contrived to process a sequential input may mean a neural network model which may model operating characteristics of the sequential input. For example, the sequential neural network model may include a recurrent neural network (RNN) or a long-short term memory (LSTM), but in the present disclosure, the sequential neural network model may mean various artificial neural network models which may process the sequential input, which include the neural network model taken as an example.

In the present disclosure, an attention mechanism may mean a mechanism which performs a prediction by referring to a previous input value in the process of producing a prediction value by using an artificial neural network of an encoder-decoder structure. The attention mechanism may be a mechanism which further reflects characteristics of a previous input value related to a current input value when referring to previous input values. When the attention mechanism is used, a vanishing gradient phenomenon which may occur when a length of input data is increases may be excellently suppressed.

FIG. 1 is a block diagram of a computing device for performing control simulation based on artificial intelligence according to an exemplary embodiment of the present disclosure.

FIG. 1 is a block diagram of a computing device for detecting a change according to an exemplary embodiment of the present disclosure.

A configuration of the computing device 100 illustrated in FIG. 1 is only an example simplified and illustrated. In an exemplary embodiment of the present disclosure, the computing device 100 may include other components for performing a computing environment of the computing device 100, and only some of the disclosed components may constitute the computing device 100.

The computing device 100 may include a processor 110, a memory 130, and a network unit 150.

The processor 110 may be constituted by one or more cores, and include processors for data analysis and deep learning, such as a central processing unit (CPU), a general purpose graphics processing unit (GPGPU), a tensor processing unit (TPU), etc., of the computing device. The processor 110 may read a computer program stored in the memory 130 and process data for machine learning according to an exemplary embodiment of the present disclosure. According to an exemplary embodiment of the present disclosure, the processor 110 may perform an operation for learning the neural network. The processor 110 may perform calculations for learning the neural network, which include processing of input data for learning in deep learning (DL), extracting a feature in the input data, calculating an error, updating a weight of the neural network using backpropagation, and the like.

At least one of the CPU, the GPGPU, and the TPU of the processor 110 may process learning of the network function. For example, the CPU and the GPGPU may process the learning of the network function and data classification using the network function jointly. In addition, in an exemplary embodiment of the present disclosure, the learning of the network function and the data classification using the network function may be processed by using processors of a plurality of computing devices together. In addition, the computer program performed by the computing device according to an exemplary embodiment of the present disclosure may be a CPU, GPGPU, or TPU executable program.

According to an exemplary embodiment of the present disclosure, the processor 110 may obtain a first state information, a second state information, and a control information.

In the present disclosure, the first state information may include one or more variables related to the outside of a control environment. The variables related to the outside of the control environment may mean variables determined outside regardless of a control. For example, when the control environment is a vehicle HVAC system, variables included in the first state information may include weather information, a velocity of a vehicle, external humidity, an external temperature, an air-conditioner volume, or an external air inflow amount.

In the present disclosure, the second state information may include one or more variables related to the inside of the control environment. The variables related to the inside of the control environment may mean variables which may be measured at the inside of the control environment, which are changed in response to the control. For example, when the control environment is the vehicle HVAC system, variables included in the second state information may include an evaporator discharge temperature, a heater core discharge temperature, an evaporator pressure or a cooler pressure, waste heat recovery information, temperature information, humidity information, air purification information, or air flow information.

In the present disclosure, the control information may be information which the control system outputs by receiving the first state information and the second state information. In an example of the vehicle HVAC system, the control information may include compressor information, valve information, heating amount information, control information for a condenser, control information for an evaporator, control information for a radiator, control information for an accumulator, control information for a chiller, control information for an outdoor heat exchanger, control information for an air purifying device, or control information for a waste heat recovery device.

In the present disclosure, the control information may include one or more control variables. In the example of the vehicle HVAC system, the control variables included in the control information may include an RPM value of the compressor, a valve opening level, or a cooling water heating amount.

However, an environment to be controlled in the present disclosure is not limited to the vehicle HVAC system, and the method of the present disclosure may be applied to various types of control systems including a heat management system, etc.

According to an exemplary embodiment of the present disclosure, the processor 110 may generate first output information based on the first state information, the second state information, and the control information by using the artificial neural network model including the sequential neural network. In this case, at least some of one or more output variables included in the first output information may correspond to the variables included in the second state information. Further, an attention mechanism may be used in the process of generating the first output information. A specific method of generating the first output information will be described later with reference to FIG. 4.

The processor 110 may generate second output information by using hidden state information output by the sequential neural network. A memory cell at each time point of the artificial neural network model which may process the sequential input such as the recurrent neural network model outputs the hidden state information to an output layer, and uses the hidden state information as an input value for calculating a hidden state at a next time point again.

Accordingly, the second output information is output information using the sequential neural network, and includes all output variables included in the first output information. Unlike this, the first output information may be output information simultaneously using the sequential neural network and the attention mechanism as described above.

The processor 110 may generate final output information based on the first output information and the second output information. When the first output information is set to $Out_{1,nt}$ and the second output information is set to $Out_{2,nt}$ with respect to an n-th output variable, the final output information $Out_{1,nt}$ may be expressed as in Equation 1.

$$Out_{n,t} = \alpha Out_{1,nt} + \beta Out_{2,n,t} \quad \text{[Equation 1]}$$

In this case, α and β which are weights may be varied by parameters which exist in respective output variables. Further, values of the weights may be different with respect to the respective output variables, and the weight may be changed at every time point.

Since the artificial neural network model outputs current state information (second state information) based on past state information and control information, the artificial neural network model may serve as a kind of simulation model that simulates the control environment in this case. Since the artificial neural network model may continuously output new state information similar to an actual environment, the artificial neural network model may train the control model using the artificial intelligence in a simulation environment other than the actual environment, while may perform a performance test of the control model using the artificial intelligence in the simulation environment.

Consequently, the simulation environment of simulating the actual control environment is constructed through the present disclosure, so cost and time required for training the control model and evaluating the performance may be significantly reduced.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

The network unit 150 according to several embodiments of the present disclosure may use various wired communication systems, such as a Public Switched Telephone Network (PSTN), an x Digital Subscriber Line (xDSL), a Rate Adaptive DSL (RADSL), a Multi Rate DSL (MDSL), a Very High Speed DSL (VDSL), a Universal Asymmetric DSL (UADSL), a High Bit Rate DSL (HDSL), and a local area network (LAN).

The network unit 150 presented in the present specification may use various wireless communication systems, such as Code Division Multi Access (CDMA), Time Division Multi Access (TDMA), Frequency Division Multi Access (FDMA), Orthogonal Frequency Division Multi Access (OFDMA), Single Carrier-FDMA (SC-FDMA), and other systems.

The network unit 150 presented in the present specification may use various wireless communication systems The techniques described herein may be used not only in the networks mentioned above, but also in other networks.

Figure 2:
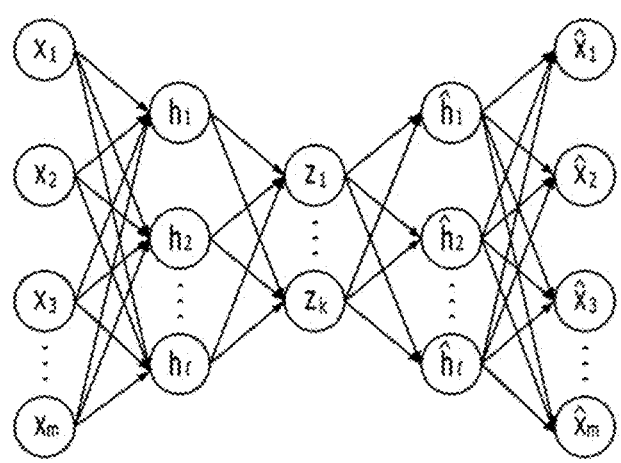
FIG. 2 is a schematic view illustrating a network function according to an exemplary embodiment of the present disclosure.

FIG. 2 is a schematic diagram illustrating a network function according to the embodiment of the present disclosure.

Throughout the present specification, the meanings of a calculation model, a nerve network, the network function, and the neural network may be interchangeably used. The neural network may be formed of a set of interconnected calculation units which are generally referred to as "nodes". The "nodes" may also be called "neurons". The neural network consists of one or more nodes. The nodes (or neurons) configuring the neural network may be interconnected by one or more links.

In the neural network, one or more nodes connected through the links may relatively form a relationship of an input node and an output node. The concept of the input node is relative to the concept of the output node, and a predetermined node having an output node relationship with respect to one node may have an input node relationship in a relationship with another node, and a reverse relationship is also available. As described above, the relationship between the input node and the output node may be generated based on the link. One or more output nodes may be connected to one input node through a link, and a reverse case may also be valid.

In the relationship between an input node and an output node connected through one link, a value of the output node data may be determined based on data input to the input node. Herein, a link connecting the input node and the output node may have a weight. The weight is variable, and in order for the neural network to perform a desired function, the weight may be varied by a user or an algorithm. For example, when one or more input nodes are connected to one output node by links, respectively, a value of the output node may be determined based on values input to the input nodes connected to the output node and weights set in the link corresponding to each of the input nodes.

As described above, in the neural network, one or more nodes are connected with each other through one or more links to form a relationship of an input node and an output node in the neural network. A characteristic of the neural network may be determined according to the number of nodes and links in the neural network, a correlation between the nodes and the links, and a value of the weight assigned to each of the links. For example, when there are two neural networks in which the numbers of nodes and links are the same and the weight values between the links are different, the two neural networks may be recognized to be different from each other.

The neural network may consist of a set of one or more nodes. A subset of the nodes configuring the neural network may form a layer. Some of the nodes configuring the neural network may form one layer on the basis of distances from an initial input node. For example, a set of nodes having a distance of n from an initial input node may form n layers. The distance from the initial input node may be defined by the minimum number of links, which need to be passed to reach a corresponding node from the initial input node. However, the definition of the layer is arbitrary for the description, and a degree of the layer in the neural network may be defined by a different method from the foregoing method. For example, the layers of the nodes may be defined by a distance from a final output node.

The initial input node may mean one or more nodes to which data is directly input without passing through a link in a relationship with other nodes among the nodes in the neural network. Otherwise, the initial input node may mean nodes which do not have other input nodes connected through the links in a relationship between the nodes based on the link in the neural network. Similarly, the final output node may mean one or more nodes that do not have an output node in a relationship with other nodes among the nodes in the neural network. Further, the hidden node may mean nodes configuring the neural network, not the initial input node and the final output node.

In the neural network according to the embodiment of the present disclosure, the number of nodes of the input layer may be the same as the number of nodes of the output layer, and the neural network may be in the form that the number of nodes decreases and then increases again from the input layer to the hidden layer. Further, in the neural network according to another embodiment of the present disclosure, the number of nodes of the input layer may be smaller than the number of nodes of the output layer, and the neural network may be in the form that the number of nodes decreases from the input layer to the hidden layer. Further, in the neural network according to another embodiment of the present disclosure, the number of nodes of the input layer may be larger than the number of nodes of the output layer, and the neural network may be in the form that the number of nodes increases from the input layer to the hidden layer. The neural network according to another embodiment of the present disclosure may be the neural network in the form in which the foregoing neural networks are combined.

A deep neural network (DNN) may mean the neural network including a plurality of hidden layers, in addition to an input layer and an output layer. When the DNN is used, it is possible to recognize a latent structure of data. That is, it is possible to recognize latent structures of photos, texts, videos, voice, and music (for example, what objects are in the photos, what the content and emotions of the texts are, and what the content and emotions of the voice are). The DNN may include a convolutional neural network (CNN), a recurrent neural network (RNN), an auto encoder, Generative Adversarial Networks (GAN), a Long Short-Term Memory (LSTM), a transformer, a restricted Boltzmann machine (RBM), a deep belief network (DBN), a Q network, a U network, a Siamese network, a Generative Adversarial Network (GAN), and the like. The foregoing description of the deep neural network is merely illustrative, and the present disclosure is not limited thereto.

In the embodiment of the present disclosure, the network function may include an auto encoder. The auto encoder may be one type of artificial neural network for outputting output data similar to input data. The auto encoder may include at least one hidden layer, and the odd-numbered hidden layers may be disposed between the input/output layers. The number of nodes of each layer may decrease from the number of nodes of the input layer to an intermediate layer called a bottleneck layer (encoding), and then be expanded symmetrically with the decrease from the bottleneck layer to the output layer (symmetric with the input layer). The auto encoder may perform a nonlinear dimension reduction. The number of input layers and the number of output layers may correspond to the dimensions after preprocessing of the input data. In the auto encoder structure, the number of nodes of the hidden layer included in the encoder decreases as a distance from the input layer increases. When the number of nodes of the bottleneck layer (the layer having the smallest number of nodes located between the encoder and the decoder) is too small, the sufficient amount of information may not be transmitted, so that the number of nodes of the bottleneck layer may be maintained in a specific number or more (for example, a half or more of the number of nodes of the input layer and the like).

The neural network may be trained by at least one scheme of supervised learning, unsupervised learning, semi-supervised learning, and reinforcement learning. The training of the neural network may be a process of applying knowledge for the neural network to perform a specific operation to the neural network.

The neural network may be trained in a direction of minimizing an error of an output. In the training of the neural network, training data is repeatedly input to the neural network and an error of an output of the neural network for the training data and a target is calculated, and the error of the neural network is back-propagated in a direction from an output layer to an input layer of the neural network in order to decrease the error, and a weight of each node of the neural network is updated. In the case of the supervised learning, training data labelled with a correct answer (that is, labelled training data) is used, in each training data, and in the case of the unsupervised learning, a correct answer may not be labelled to each training data. That is, for example, the training data in the supervised learning for data classification may be data, in which category is labelled to each of the training data. The labelled training data is input to the neural network and the output (category) of the neural network is compared with the label of the training data to calculate an error. For another example, in the case of the unsupervised learning related to the data classification, training data that is the input is compared with an output of the neural network, so that an error may be calculated. The calculated error is back-propagated in a reverse direction (that is, the direction from the output layer to the input layer) in the neural network, and a connection weight of each of the nodes of the layers of the neural network may be updated according to the backpropagation. A change amount of the updated connection weight of each node may be determined according to a learning rate. The calculation of the neural network for the input data and the backpropagation of the error may configure a learning epoch. The learning rate is differently applicable according to the number of times of repetition of the learning epoch of the neural network. For example, at the initial stage of the learning of the neural network, a high learning rate is used to make the neural network rapidly secure performance of a predetermined level and improve efficiency, and at the latter stage of the learning, a low learning rate is used to improve accuracy.

In the training of the neural network, the training data may be generally a subset of actual data (that is, data to be processed by using the trained neural network), and thus an error for the training data is decreased, but there may exist a learning epoch, in which an error for the actual data is increased. Overfitting is a phenomenon, in which the neural network excessively learns training data, so that an error for actual data is increased. For example, a phenomenon, in which the neural network learning a cat while seeing a yellow cat cannot recognize cats, other than a yellow cat, as cats, is a sort of overfitting. Overfitting may act as a reason of increasing an error of a machine learning algorithm. In order to prevent overfitting, various optimizing methods may be used. In order to prevent overfitting, a method of increasing training data, a regularization method, a dropout method of inactivating a part of nodes of the network during the training process, a method using a bath normalization layer, and the like may be applied.

Figure 3:
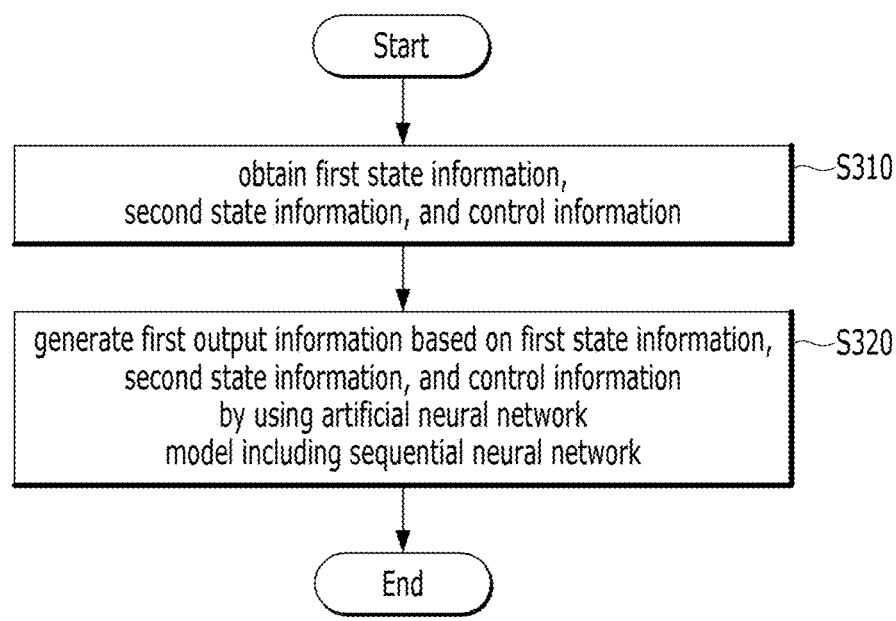
FIG. 3 is a flowchart illustrating a process of performing control simulation based on artificial intelligence according to an exemplary embodiment of the present disclosure.

FIG. 3 is a flowchart illustrating a process of performing control simulation based on artificial intelligence according to an exemplary embodiment of the present disclosure.

According to FIG. 3, the process of performing control simulation based on artificial intelligence according to an exemplary embodiment of the present disclosure may include a step S310 of obtaining a first state information, a second state information, and a control information, and a step S320 of generating first output information based on the first state information, the second state information, and the control information by using an artificial neural network model including a sequential neural network.

In step S310, the processor 110 may obtain the first state information, the second state information, and the control information. The first state information, the second state information, and the control information are described with reference to FIG. 1.

In step S320, the processor 110 may generate first output information based on the first state information, the second state information, and the control information by using the artificial neural network model including the sequential neural network. In order to generate first output information, the sequential neural network may generate hidden state information at a control time point based on the first state information, the second state information, and the control information. Thereafter, the processor may calculate attention values at the control time point with respect to one or more output variables, respectively based on the hidden state information by using an attention mechanism. The attention value may be a kind of weight. Specifically, the attention value may be a weight indicating at what degree past output values are reflected in generating a prediction value at a current time point.

In order to acquire the attention values at the control time point with respect to the respective output variables, the processor may generate query vectors and value vectors of a number corresponding to the output variables, and generate key vectors. For example, when the number of output variables is 2, a total of two query vectors, two value vectors, and two key vectors may be generated. In this case, all values of respective key vectors may have the same value regardless of the output variable, and may be set to different values according to the output variables. A specific method for generating the respective vectors will be described later with reference to FIG. 4.

The processor 110 may calculate attention scores with respect to the output variables, respectively based on the query vectors. The attention score may mean a scale indicating how important an output at each past time point is in calculating a current output in the attention mechanism.

The processor 110 may calculate an attention distribution based on the attention score, and calculate attention values with respect to respective output variables based on the attention distribution. A specific method for calculating the attention score and the attention distribution will be described later with reference to FIG. 4.

In the present disclosure, output information of the artificial neural network model may include one or more output variables, so at least some of the output variables may be variables included in the second state information. Further, the output variables may include variables not included in the first state information, the second state information, and the control information. For example, when the second state information has three variables: 'evaporator discharge temperature', 'heater core discharge temperature', and 'evaporator pressure', and the output variables may be 'evaporator discharge temperature', 'heater core discharge temperature', 'evaporator pressure', and 'compression energy consumption'. Values corresponding to the variables included in the second state information among values which the artificial neural network model outputs at the current time point may be input as the second state information of the artificial neural network model at a next time point. That is, the artificial neural network some (the evaporator discharge temperature, the heater core discharge temperature, and the evaporator pressure) of information (the evaporator discharge temperature, the heater core discharge temperature, the evaporator pressure, and the compression energy consumption) output at a time point t may become some of the information input at a time point t+1.

In an actual control environment, as a control value is changed, a delay time exists in a change of internal variables of the control environment, so internal variables of respective control environments may have different delay time. Further, even with respect to the same internal variable, the delay time of the internal variables of the control environment may vary depending on a condition of an external variable of the control environment. When the attention mechanism is used in addition to the sequential artificial neural network in constructing a model of simulating the control environment as in the present disclosure, an output of the simulation model refers to each previous time point, so characteristics having different delay time may be reflected in the control environment. Further, in order to generate the prediction values of the respective output variables, multiple query vectors may be generated from one hidden state information, and the attention mechanism is applied to each query vector to assign different weights to the respective output variables.

Consequently, there is an effect in that a performance of the artificial intelligence model of simulating the control environment is remarkably enhanced through the present disclosure.

Figure 4:
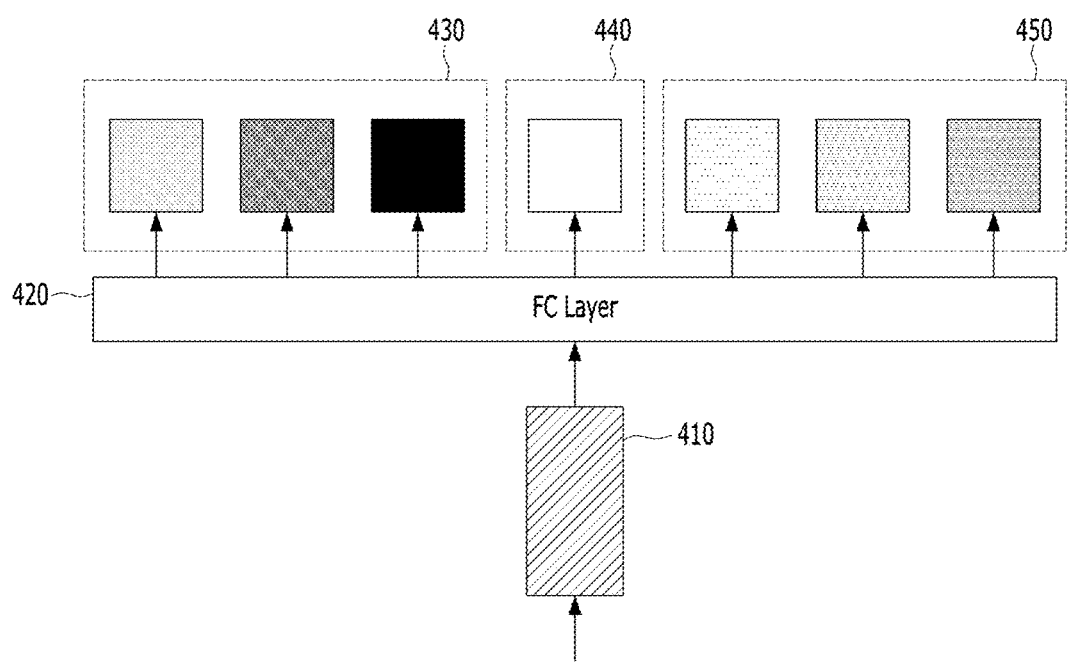
FIG. 4 is a conceptual view illustrating a method for generating query, key, and value vectors from a fully connected layer according to an exemplary embodiment of the present disclosure.

FIG. 4 is a conceptual view illustrating a method for generating query, key, and value vectors from a fully connected layer according to an exemplary embodiment of the present disclosure.

In the present disclosure the sequential neural network model 410 may output hidden state information. The hidden state information may be input into a fully connected layer 420, and then used for generating respective vectors. In this case, the fully connected layer 420 may be designed as a neural network having a plurality of layers, and unlike this, may be a type of a neural network having only one layer.

The processor 110 inputs the hidden state information into the fully connected layer 420 to generate a query vector 430, a key vector 440, and a value vector 450. In this case, the number of query vectors 430 may be equal to the number of output variables in a current control environment. For example, when the output variables are three types: evaporator discharge temperature, heater core discharge temperature, and compressor energy consumption, the processor 110 may generate three query vectors 430.

The key vector 440 may be set equally with respect to all output variables, and different key vectors 440 may be generated for each output variable. For example, when the output variables are three types, all of the three key vectors may have the same value, and all of the three key vectors may have different values.

The processor 110 may generate value vectors 450 of the same number as the query vectors 430.

Figure 5:
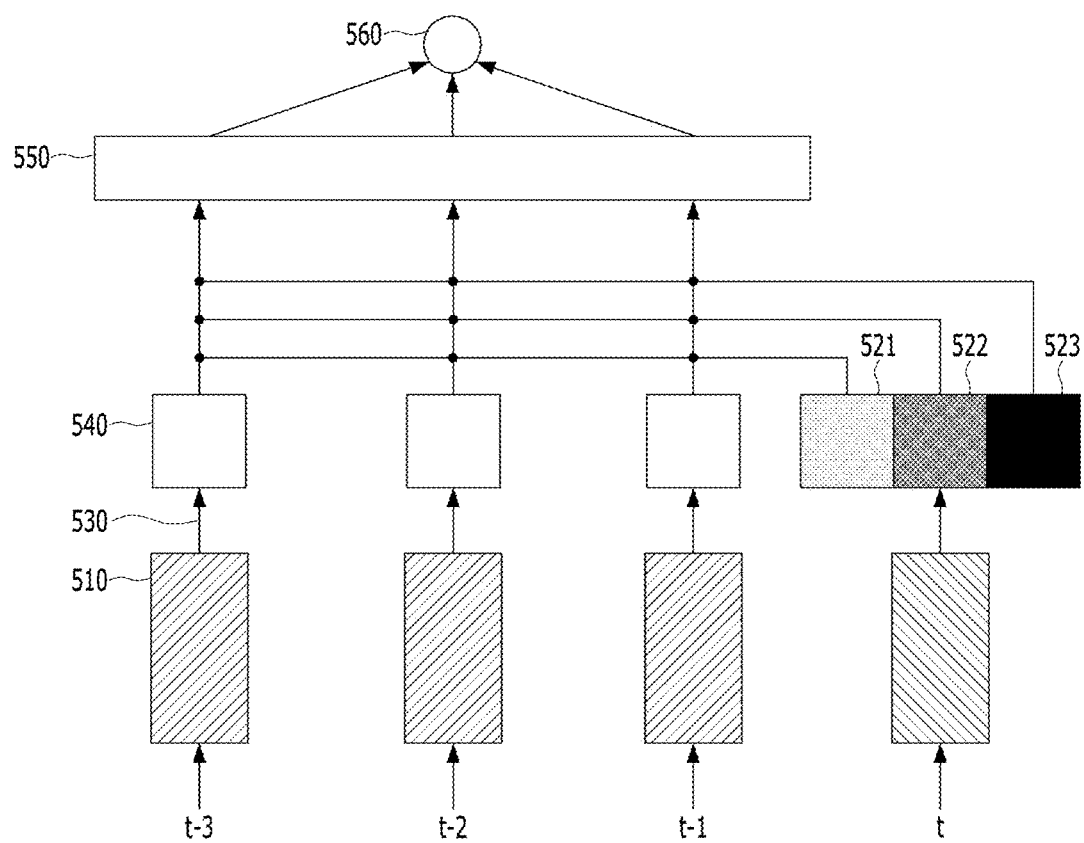
FIG. 5 is a conceptual view illustrating a method for implementing an attention mechanism according to an exemplary embodiment of the present disclosure.

FIG. 5 is a conceptual view illustrating a method for implementing an attention mechanism according to an exemplary embodiment of the present disclosure. The sequential neural network 510 of FIG. 5 may output hidden state information 530 by receiving new inputs (first state information, second state information, and control information) at each time point. Thereafter, in the present disclosure, the processor 110 may acquire an attention value 560 for each output variable by using the attention mechanism.

Hereinbelow, a process of acquiring the attention value at a time point t when the number of output variables is three will be described.

At the time point t, the first state information, the second state information, and the control information may be input. The processor 110 may generate the hidden state information at the time point t from an input value by using the sequential neural network 510. Thereafter, the processor 110 may generate three query vectors 521, 522, and 523, three key vectors 540, and three value vectors (not illustrated) based on the hidden state information. In this case, values of the key vectors 522 may have the same as each other with respect to all output variables, and may be different values according to the output variables. FIG. 5 illustrates a case where the key vectors are the same with respect to all output variables. A specific method for generating the query vector 521, the key vector 522, and the value vector 523 is described above with reference to FIG. 4.

In the above example, when the size of the query vector is 3, and an output of the fully connected layer is [1.1, 2.1, 3.4, 5.1, 4.3, 7.5, 5.4, 2.8, 3.5, 9.1, 8.3, 6.5, 1.3, 0.5, 0.8], the respective query vectors, key vectors, and value vectors at the time point t may be determined as below.

$Q_{out1,t}=[1.1,2.1,3.4]$ $Q_{out2,t}=[5.1,4.3,7.5]$ $Q_{out3,t}=[5.4,2.8,3.5]$ $K_t=[9.1,8.3,6.5]$ $V_{out1,t}=[1.3]$ $V_{out2,t}=[0.5]$ $V_{out3,t}=[0.8]$ Respective query vectors generated with the same number as the number of output variables are operated with the key vector, and the attention score for each time point may be calculated with respect to the respective output variables. For example, with respect to a first output variable, the attention score may be calculated based on a dot product of the query vector and the key vector. Specifically, when a size of an attention window is 3, the attention score for each time point may be calculated as in Equation 2.

$e'=[Q_{out1,t} \cdot K_t, Q_{out1,t-1} \cdot K_{t-1}, Q_{out1,t-2} \cdot K_{t-2}, Q_{out1,t-3} \cdot K_{t-3}]$ [Equation 2]

In Equation 2, the dot product is used for calculating the attention score, but in the present disclosure, a method such as scaled dot, concatenate, location-base, etc., may be used to calculate the attention score.

Thereafter, the processor 110 may calculate an attention distribution based on the attention score and a softmax function 550. Specifically, in the above example, an attention distribution $\alpha^t$ may be calculated through Equation 3.

$a^t=\text{softmax}(e')=[s_t,s_{t-1},s_{t-2},s_{t-3}]$ [Equation 3]

Thereafter, the attention value may be calculated as in Equation 4 with respect to a first output variable.

$\text{Out}_{1,t}=s_t \times [V_{out1,t}+s_{t-1} \times V_{out1,t-1}+s_{t-2} \times V_{out1,t-2}+s_{t-3} \times V_{out1,t-3}]$ [Equation 4]

The processor 110 may perform the above process equally with respect to respective variables, and then calculate the attention value for each output variable. Thereafter, the processor 110 may calculate the first output information at the time point t based on the attention value for each output variable.

Figure 6:
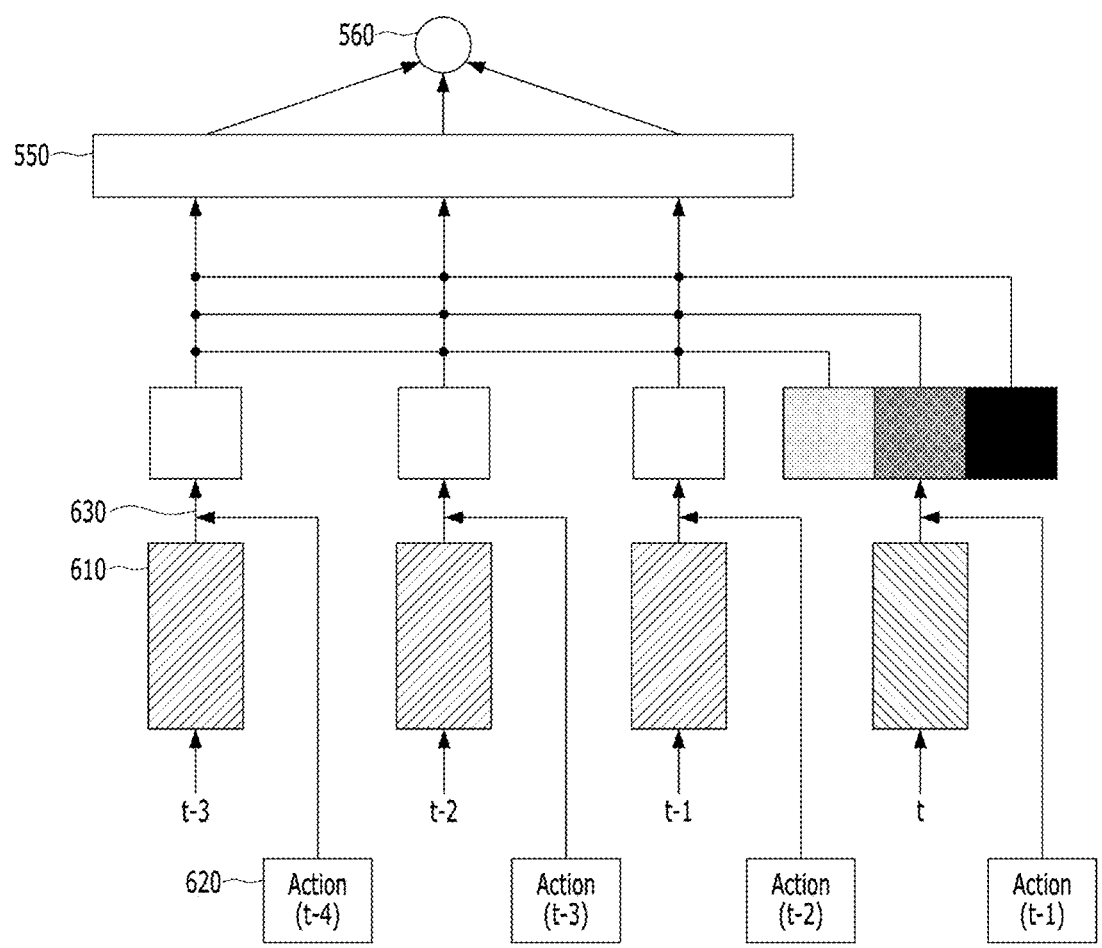
FIG. 6 is a conceptual view illustrating a method for implementing an attention mechanism by concatenating control information according to an exemplary embodiment of the present disclosure.

FIG. 6 is a conceptual view illustrating a method for implementing an attention mechanism by concatenating control information according to an exemplary embodiment of the present disclosure.

In the present disclosure, before the query vector, the key vector, and the value vector is generated at the time point t, control information 620 may be concatenated. Specifically, hidden state information 630 output by the sequential artificial neural network 610 at each time point is a vector type, so the control information 620 at the previous time point may be concatenated to the vector. Thereafter, the concatenated vector is made to pass through the fully connected layer to generate the query vector, the key vector, and the value vector.

When the method illustrated in FIG. 6 is used, the artificial neural network further uses the control information in generating the output information at each time point, and as a result, there may be an effect in that the output information generated by the model is closer to the actual control environment.

In the meantime, according to an embodiment of the present disclosure, a computer readable medium storing a data structure is disclosed.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as "nodes". The "nodes" may also be called "neurons." The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 7:
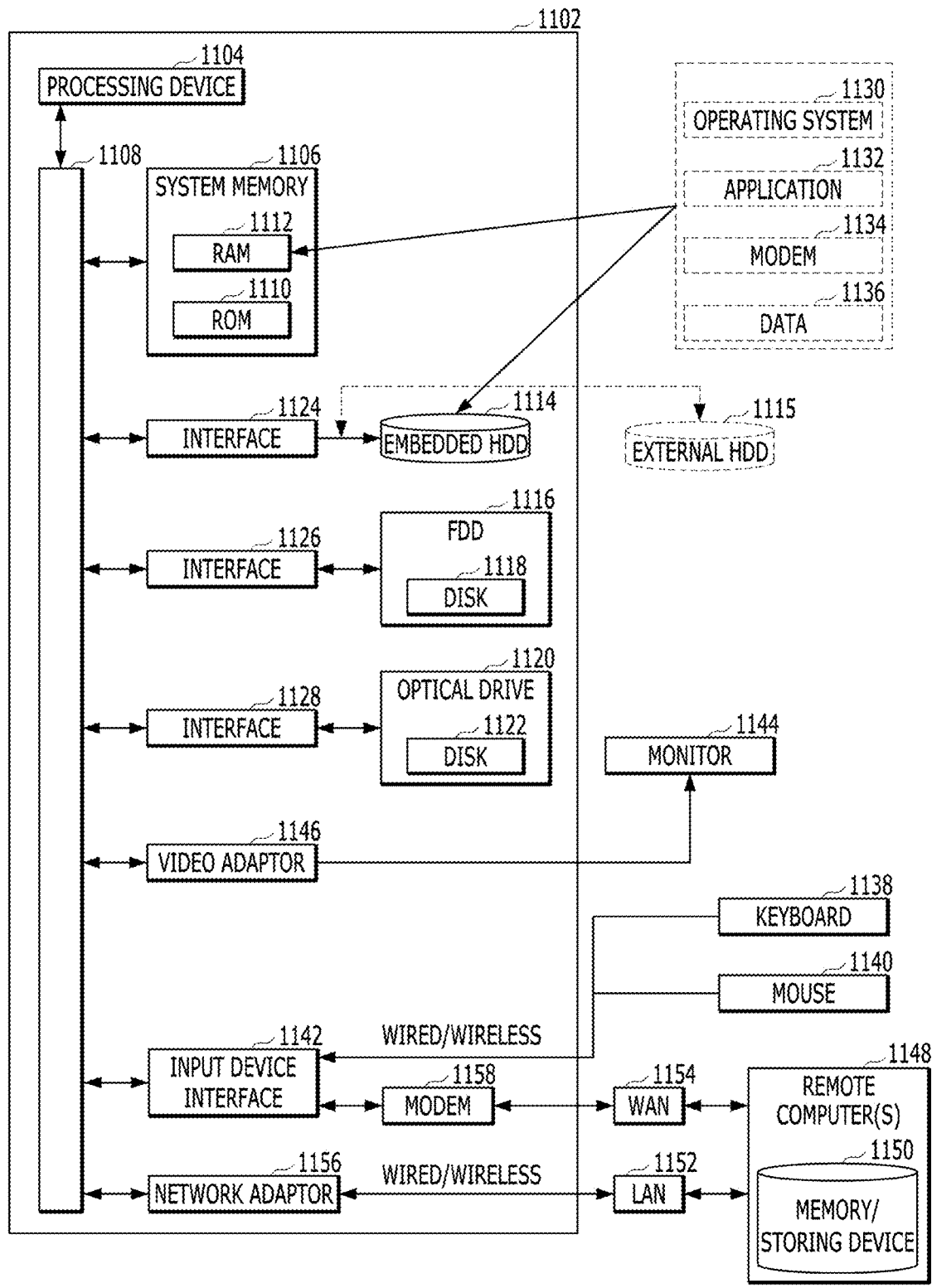
FIG. 7 is a simple and normal schematic view of an exemplary computing environment in which the exemplary embodiments of the present disclosure may be implemented.

FIG. 7 is a simple and general schematic diagram illustrating an example of a computing environment in which the embodiments of the present disclosure are implementable.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described herein in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method performed by a computing device for control simulation of a control environment based on artificial intelligence, the method comprising:
   obtaining a first state information, a second state information, and a control information, wherein the first state information includes variables related to an outside of the control environment and that are independent of the control information, and wherein the second state information includes variables related to an inside of the control environment; and
   generating a first output information based on the first state information, the second state information, and the control information by using an artificial neural network model including a sequential neural network,
   wherein the first output information includes a plurality of output variables,
   at least some of the plurality of output variables correspond to variables included in the second state information, and
   the first output information is generated based on applying an attention mechanism generating query vectors and value vectors of a number corresponding to the plurality of output variables from a hidden state.

2. The method of claim 1, wherein the generating of the first output information including the prediction value for the second state information based on the first state information, the second state information, and the control information by using the artificial neural network model including the sequential neural network includes
   generating a hidden state information at a control time point based on inputting the first state information, the second state information, and the control information into the sequential neural network,
   calculating attention values at the control time point with respect to the plurality of output variables, respectively based on the hidden state information, and
   generating the first output information based on the attention values.

3. The method of claim 2, wherein the calculating of the attention values at the control time point with respect to the plurality of output variables, respectively based on the hidden state information includes
   generating value vectors and query vectors based on the hidden state information, wherein the number of value vectors and the number of query vectors is equal to a number of output variables in the plurality of output variables,
   calculating an attention score for each of the plurality of output variables based on the query vector,
   calculating an attention distribution based on the attention score, and
   calculating attention values with respect to the plurality of output variables, respectively based on the attention distribution and the value vector.

4. The method of claim 3, wherein the generating of the query vectors and the value vectors of a number corresponding to the plurality of output variables based on the hidden state information includes
   generating the value vectors and the query vectors of a number corresponding to the plurality of output variables based on inputting the hidden state information into a fully connected layer.

5. The method of claim 3, wherein the generating of the query vectors and the value vectors of a number corresponding to the plurality of output variables based on the hidden state information includes
   concatenating the control information to the hidden state information, and
   generating the value vectors and the query vectors of a number corresponding to the plurality of output variables based on the concatenated information.

6. The method of claim 2, further comprising:
   generating a second output information based on the hidden state information; and
   generating a final output information based on the first output information and the second output information.

7. The method of claim 6, wherein the final output information is generated based on a result of a weighted sum operation of a value of the output variable included in the first output information and a value of the corresponding output variable included in the second output information.

8. The method of claim 7, wherein a weight of the weighted sum operation may be set differently for each output variable.

9. A computer program stored in a non-transitory computer-readable storage medium, wherein the computer program performs operations for control simulation of a control environment based on artificial intelligence when executed by at least one processor included in a computing device, and the operations comprising:
- an operation of obtaining a first state information, a second state information, and a control information, wherein the first state information includes variables related to an outside of the control environment and that are independent of the control information, and wherein the second state information includes variables related to an inside of the control environment; and
- an operation of generating a first output information based on the first state information, the second state information, and the control information by using an artificial neural network model including a sequential neural network, and
- wherein the first output information includes a plurality of output variables,
- at least some of the plurality of output variables correspond to variables included in the second state information, and
- the first output information is generated based on applying an attention mechanism generating query vectors and value vectors of a number corresponding to the plurality of output variables from a hidden state.

10. A computing device comprising:
- at least one processor; and
- a memory,
- wherein the at least one processor is configured to:
  - obtain a first state information, a second state information, and a control information, wherein the first state information includes variables related to an outside of a control environment, and wherein the second state information includes variables related to an inside of the control environment and that are independent of the control information, and
  - generate a first output information based on the first state information, the second state information, and the control information by using an artificial neural network model including a sequential neural network, and
  - the first output information includes a plurality of output variables,
  - at least some of the plurality of output variables correspond to variables included in the second state information, and
  - the first output information is generated based on applying an attention mechanism generating query vectors and value vectors of a number corresponding to the plurality of output variables from a hidden state.

* * * * *